(12) United States Patent
Kang et al.

(10) Patent No.: US 10,542,128 B2
(45) Date of Patent: Jan. 21, 2020

(54) MOBILE TERMINAL

(71) Applicant: LG ELECTRONICS INC., Seoul (KR)

(72) Inventors: Timothy Kang, Seoul (KR); Taesun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/742,401

(22) PCT Filed: Jul. 27, 2015

(86) PCT No.: PCT/KR2015/007789
§ 371 (c)(1),
(2) Date: Jan. 5, 2018

(87) PCT Pub. No.: WO2017/007060
PCT Pub. Date: Jan. 12, 2017

(65) Prior Publication Data
US 2018/0198896 A1 Jul. 12, 2018

(30) Foreign Application Priority Data
Jul. 7, 2015 (KR) .......................... 10-2015-0096434

(51) Int. Cl.
*H04M 1/00* (2006.01)
*H04B 1/38* (2015.01)
(Continued)

(52) U.S. Cl.
CPC ........ *H04M 1/0216* (2013.01); *G09G 3/3208* (2013.01); *G09G 2320/0261* (2013.01); *G09G 2380/02* (2013.01); *H04M 1/0245* (2013.01)

(58) Field of Classification Search
CPC .. H04M 1/0214; H04M 1/0216; H04M 1/022; H04M 1/0235; H04M 1/0237;
(Continued)

(56) References Cited

U.S. PATENT DOCUMENTS

| 8,654,095 B1* | 2/2014 | Cho | ...................... | G06F 3/0412 |
| | | | | 345/173 |
| 8,804,324 B2* | 8/2014 | Bohn | .................... | G06F 1/1616 |
| | | | | 455/575.4 |

(Continued)

FOREIGN PATENT DOCUMENTS

| EP | 2728433 | 5/2014 |
| EP | 2765479 | 8/2014 |

(Continued)

OTHER PUBLICATIONS

PCT International Application No. PCT/KR2015/007789, Written Opinion of the International Searching Authority dated Mar. 30, 2016, 24 pages.

(Continued)

*Primary Examiner* — Quochien B Vuong
(74) *Attorney, Agent, or Firm* — Lee, Hong, Degerman, Kang & Waimey PC

(57) ABSTRACT

In order to achieve the above or other objectives, a mobile terminal according to an aspect of the present invention comprises, a first body; a second body rotatably connected to a first direction side of the first body; a hinge part which is placed between the first body and the second body so as to rotatably connect the second body to the first body; and a flexible display unit, one side of which is placed on one surface of the first body and the other side of which is placed on one surface of the second body, wherein the flexible display unit is bent according to a change in the angle of the hinge part. The mobile terminal has an advantage in that the flexible display unit is slidably coupled to at least one of the (Continued)

bodies so as to be slidingly moved according to a rotation of the hinge part, and thus no folding occurs in the surface of the flexible display unit placed on the hinge part.

20 Claims, 15 Drawing Sheets

(51) Int. Cl.
*H04M 1/02* (2006.01)
*G09G 3/3208* (2016.01)

(58) Field of Classification Search
CPC H04M 1/0247; H04M 1/0268; H04B 1/3888; H04W 88/02; G06F 1/1616; G06F 1/1641; G06F 1/1652
USPC ............. 455/90.3, 566, 575.1, 575.3, 575.4
See application file for complete search history.

(56) References Cited

U.S. PATENT DOCUMENTS

| | | | | |
|---|---|---|---|---|
| 8,908,365 | B2* | 12/2014 | Walters | G09F 19/00 345/520 |
| 9,213,428 | B2* | 12/2015 | Ma | G06F 1/1616 |
| 9,298,297 | B2* | 3/2016 | Kim | G06F 3/0412 |
| 9,342,106 | B2* | 5/2016 | Nurmi | G06F 1/1652 |
| 9,348,362 | B2* | 5/2016 | Ko | G06F 1/1626 |
| 9,491,272 | B2* | 11/2016 | Kim | H04M 1/0268 |
| 9,754,520 | B2* | 9/2017 | Kwon | G09G 3/001 |
| 9,798,359 | B2* | 10/2017 | Seo | G06F 1/1652 |
| 9,830,075 | B2* | 11/2017 | Kim | G06F 3/04817 |
| 10,235,037 | B2* | 3/2019 | Kim | G06F 3/041 |
| 2006/0146488 | A1 | 7/2006 | Kimmel | |
| 2012/0314399 | A1 | 12/2012 | Bohn et al. | |
| 2013/0178248 | A1 | 7/2013 | Kim | |
| 2014/0362513 | A1 | 12/2014 | Nurmi | |
| 2015/0077917 | A1 | 3/2015 | Song | |

FOREIGN PATENT DOCUMENTS

| | | |
|---|---|---|
| KR | 1020140091273 | 7/2014 |
| KR | 1020140101274 | 8/2014 |
| KR | 1020140115226 | 9/2014 |
| KR | 1020150037383 | 4/2015 |

OTHER PUBLICATIONS

European Patent Office Application Serial No. 15897782.7, Search Report dated Mar. 1, 2019, 15 pages.
European Patent Office Application U.S. Appl. No. 15897782.7, Search Report dated May 29, 2019, 14 pages.

* cited by examiner (a)

(b)

(a)

(b)

(a)

(b) (c)

(a)

(b)

(a)

(b)

MOBILE TERMINAL

CROSS-REFERENCE TO RELATED APPLICATIONS

This application is the National Stage filing under 35 U.S.C. 371 of International Application No. PCT/KR2015/007789, filed on Jul. 27, 2015, which claims the benefit of earlier filing date and right of priority to Korean Application No. 10-2015-0096434, filed on Jul. 7, 2015, the contents of which are all hereby incorporated by reference herein in their entirety.

TECHNICAL FIELD

Embodiments of the present disclosure relate to a mobile terminal including flexible display unit.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

To support and enhance such the functions of the mobile terminal, improvement of a structure and/or software programs of the mobile terminal may be put into consideration.

A mobile terminal having a flexible display which has a deformable shape is being developed. Such a mobile terminal includes a case having a hinge part and a flexible display unit which is bendable along the rotation of the hinge part provided in the case. In this instance, the mobile terminal has a disadvantage of a degraded quality which might be caused by the wrinkles generated in the flexible display.

DETAILED DESCRIPTION OF THE INVENTION

Technical Problem

To overcome the disadvantages, an object of the present invention is to address the above-noted and other problems and to provide a mobile terminal including a sliding structure so as to prevent wrinkles of a flexible display unit when a hinge part is rotating.

Technical Solution

To achieve these objects and other advantages and in accordance with the purpose of the embodiments, as embodied and broadly described herein, a mobile terminal comprises a first body; a second body rotatably coupled to a first-direction lateral surface of the first body; a hinge part provided between the first body and the second body and rotatably connected with the second body; and a flexible display unit comprising one surface provided in one surface of the first body and the other surface located in one surface of the second body, wherein the flexible display unit is bent according to angle variation of the hinge part.

The hinge part may be deformable between a first state where one surface of the first body and one surface of the second body are directed toward the same direction by arranging the first body and the second body side by side in a lateral direction and a second state where one surface of the first body and one surface of the second body are directed in opposite by overlapping the first body and the second body with each other.

The mobile terminal may further comprise a sliding member coupled to a rear surface of the flexible display unit and configured to slide from one surface of the first body in the first direction.

The sliding member may be moved closer to the hinge part when the hinge part is in the second state and farther from the hinge part when the hinge part is in the first state.

The mobile terminal may further comprise a flexible member comprising one end coupled to the first body and the other end coupled to the sliding member to assist the sliding motion of the sliding member.

The flexible member may be a plate spring configured to apply a force to the sliding member to be in the first state or the second state by having a compression force when the user pushes the sliding member in a first direction and supplying a restoring force for restoring the original state.

In the second state, the flexible display unit may comprise a first area located on the first body in the second state; a second area located on the second body; and a third area located between the first area and the second area, and in the first state, the first area and the third area are located on one surface of the first body.

The flexible display unit may further comprise a touch sensor, and the mobile terminal may further comprise a controller implemented to control the flexible display unit to arrange a touch key in the third area in the second state.

The first body may comprise an opening which is covered by the flexible display unit in the first state and exposed as the flexible display unit is moved in the second state, and at least one of a camera, a user input unit, a proximity sensor and a fingerprint recognizing sensor may be arranged in the opening.

The mobile terminal may further comprise a controller implemented to activate at least one of the camera, the user input unit and the fingerprint recognizing sensor, when the first state is changed into the second state.

The mobile terminal may further comprise a controller implemented to provide the image acquired by the camera to the first area of the flexible display unit, when a human face equal to or larger than a reference size is recognized in the image acquired by the camera in case of activating the camera, and to provide the image acquired by the camera to the second area of the flexible display unit, when no human face equal to or large than the reference size is recognized in the image acquired by the camera.

The mobile terminal may further comprise a display support portion located in the rear surface of the third area; and a plurality of V-shaped grooves extended from a rear surface of the display support portion in a second direction which is perpendicular to the first direction and arranged side by side in the first direction, wherein the width of the groove becomes narrower in the second state.

The sliding member may be located in the first area of the flexible display unit and has the same thickness with the flexible display unit.

The mobile terminal may further comprise a controller implemented to provide a continuous image to the first area, the second area and the third area of the flexible display unit in the first state and to provide an image to at least one of the first area, the second area and the third area and provide divided images along edges of the first area, the second area and the third area.

The flexible display unit may further comprise a touch sensor and deactivates the area of the first, second and third areas where a touch input is sensed out of a reference range of areas for a reference time period or more in the second state.

The hinge part may be configured to perform rotational motion and sliding motion and comprise a first bracket fixed to the first body; a second bracket configured to slidingly move in a first direction with respect to the first bracket; and a third bracket rotatably coupled to the second bracket and fixed to the second body.

The third bracket may have a column shape having a shaft penetrating a longitudinal direction, and the second bracket is coupled to the shaft, while surrounding both ends of the column.

The mobile terminal may further comprise a cam projected from the first bracket, wherein the third bracket comprises a cam receiving groove which surrounds the cam in the second state and separates from the cam in the first state.

The mobile terminal may further comprise a hinge groove recessed from a rear surface of the first body, wherein the first bracket is fixed to an inside of the hinge groove, and the second bracket and the third bracket are inserted in the hinge groove in the second state and projected from the hinge groove in the first state.

The mobile terminal may further comprise a gyro-sensor configured to sense the slope of the first or second body; and a controller implemented to provide an image to the first area of the flexible display unit when the first body is located in an upper portion and an image to the second area of the flexible display unit when the second body is located in the upper portion, based on the slope sensed by the gyro-sensor in the second state.

The area of the first body may be equal to the area of the second body.

Advantageous Effects

Accordingly, the embodiments have following advantageous effects. According to at least one embodiment of the present disclosure, the mobile terminal including the plurality of the bodies; and the flexible display unit which is foldable with respect to the hinge part for connecting the bodies with each other may have the advantage that the flexible display unit located in the hinge part has no folding on the surface, because the flexible display unit is slidingly coupled to at least one body and slidingly moved along the rotation of the hinge part.

Furthermore, other screens may be provided to the screen of the flexible display unit according to the locations of the bodies. Accordingly, the mobile terminal availability may be improved.

Still further, the body slidingly coupled to the flexible display unit may include the camera selectively exposed along the motion of the flexible display unit and secure a sufficient component loading space, together with the large screen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF SPECIFIC EMBODIMENTS

Figure 1:
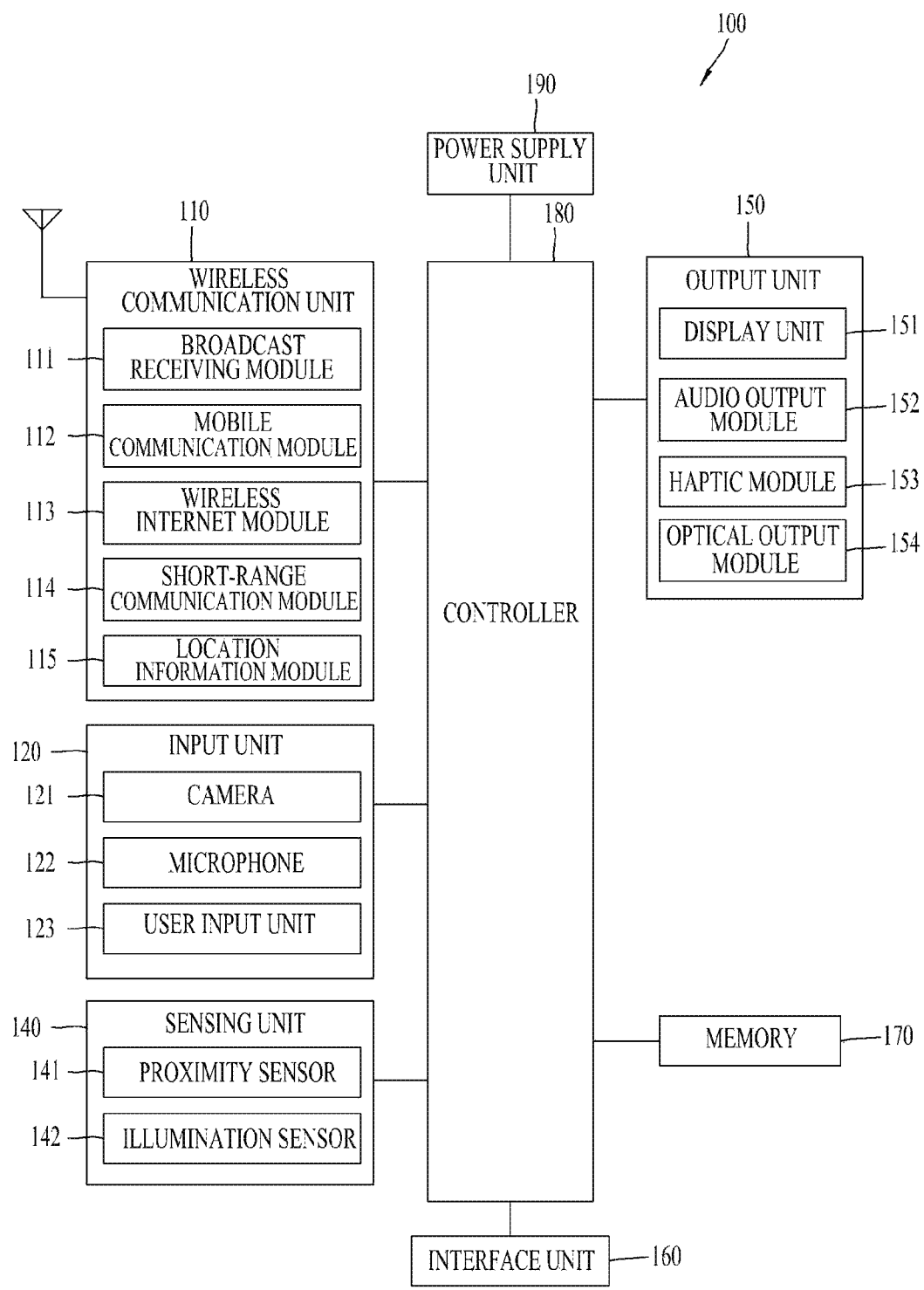
FIG. 1 is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

where FIG. 1 is a block diagram of a mobile terminal in accordance with the present disclosure The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1 is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2A:
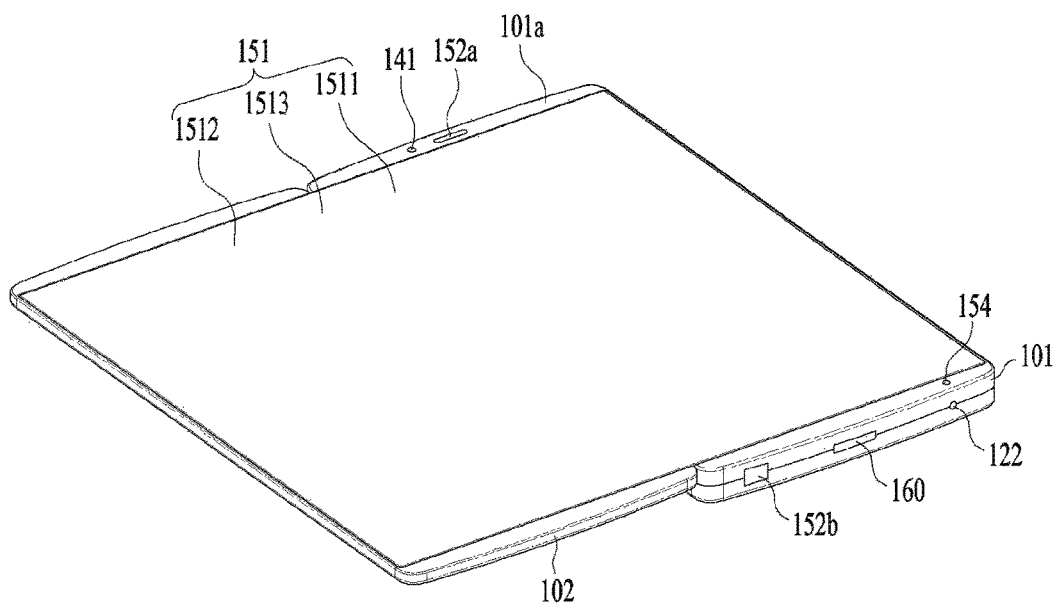
FIGS. 2a and 2b are front views illustrating a first state and a second state of a mobile terminal in accordance with one embodiment.
Figure 2B:
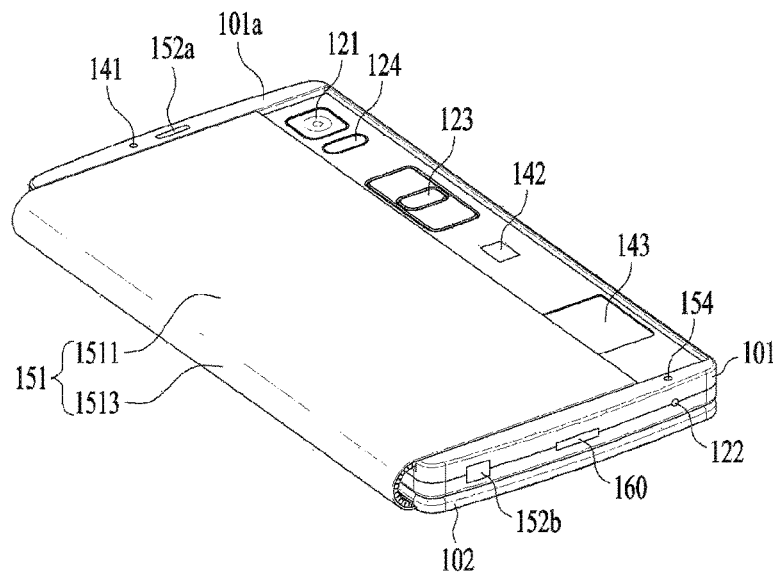

FIGS. 2a and 2b are front views illustrating a first state and a second state of a mobile terminal in accordance with one embodiment. The mobile terminal is configured of two bodies which include a first body 101 and a second body 102 coupled to a lateral surface in a first direction. The first body 101 and the second body 102 are coupled to each other by a hinge part 200 so that an angle between the first body 101 and the second body 102 may be variable.

In the drawings, the first body 101 and the second body 102 are rectangular-shaped and the second body 102 is arranged side by side with respect a long side of the first body 101. A width direction of the first and second bodies 101 and 102 may be defined as 'the first direction' and a longitudinal direction which is perpendicular to the width direction is defined as 'the second direction'. In this instance, the first direction and the second direction are not limited to the width direction and the longitudinal direction. The first direction may be the longitudinal direction and the second direction may be the width direction.

The first body 101 and the second body 102 may have the same size. In this illustrated embodiment, most electronic components are loaded in the first body 101 and the second body 102 may be relatively thinner than the first body 101. If dividing the space where the electronic components are loaded into two spaces, a useable space is likely to decrease in consideration of the actual volume and it is advantageous in reducing the overall size to load most of the electronic components in one body.

The mobile terminal 100 includes a case which defines the exterior design (e.g., a frame, a housing, a cover, etc.). A plurality of cases may be coupled to each other to define an inner space and diverse electronic components are arranged in the inner space.

The display unit 151 is disposed on a front side of the terminal body to output information. As shown in the drawing, the window 151a of the display unit 151 is disposed on a front case and defines a front surface of the terminal body, together with the front case. The cases may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

The mobile terminal 100 may include the display unit 151, the audio output module, the proximity sensor 141, the illuminance sensor 142, the optical output module 154, the camera 121, the user input unit 123, the microphone 122 and the interface unit 160.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Especially, the mobile terminal in accordance with the present disclosure may use the display unit which has a variable curvature when the two bodies are rotated on the hinge part 200. As shown in FIG. 2b, the display unit 151 may be deformable by an external force and the deformation of the display unit 151 may be one or more of the curving, bending, folding, twisting and rolling.

The deformable display unit 151 may also be referred to as a "flexible display unit." In some implementations, the flexible display unit 151 may include a general flexible display, electronic paper (also known as e-paper), and combinations thereof.

The flexible display of mobile terminal 200 100 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 151 is not deformed (for example, in a state with an infinite radius of curvature and referred to as a first state), a display region of the flexible display unit 151 includes a generally flat surface. When in a state that the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

The first state of the flexible display unit 151 may be a curved state (for example, a state of being curved from up to down or from right to left), instead of being in flat state. In this embodiment, when an external force is applied to the flexible display unit 151, the flexible display unit 151 may transition to the second state such that the flexible display unit is deformed into the flat state (or a less curved state) or into a more curved state.

The flexible display unit 151 may include a touch sensor configured to sense touches of the flexible display unit 151 to receive an input of a control command by a touch method. When a touch is input to the flexible display unit 151 by using the touch sensor, the touch sensor is implemented to sense the touch and the controller 180 is implemented to generate a corresponding control command to the touch. The contents input by the touch method may include texture or numbers or instructions or menu items which are assignable in diverse modes by the touch method.

Meanwhile, the touch sensor is configured as a film type having a touch pattern which is arranged between the window 151a and a display (not shown) disposed on a rear surface of the window 151a or a metal wire which is directly patterned on the rear surface of the window 151a. The touch sensor may be integrally formed with the display as one body. For example, the touch sensor may be provided on a substrate of the display or in the display.

As mentioned above, the flexible display unit 151 may form a touch screen, together with the touch sensor. In this instance, the touch screen may function as the user input unit (123, see FIG. 1). The flexible touch screen may be configured to sense touch inputs not only in the first state but also in the second state.

One option is to configure the mobile terminal 200 100 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 151, or generate a control signal for controlling a function of the mobile terminal 200100, based on the information related to the deforming of the flexible display unit 251. Such information is typically sensed by the deformation sensor.

The mobile terminal 200 100 is shown having a case 201 101 for accommodating the flexible display unit 151. The case 201 101 can be deformable together with the flexible display unit 151, taking into account the characteristics of the flexible display unit 151.

A battery (not shown in this figure) located in the mobile terminal 200 100 may also be deformable in cooperation with the flexible display unit 151, taking into account the characteristic of the flexible display unit 151. One technique to implement such a battery is to use a stack and folding method of stacking battery cells.

The deformation of the flexible display unit 151 not limited to perform by an external force. For example, the flexible display unit 151 can be deformed into the second state from the first state by a user command, application command, or the like.

When the first state shown in FIG. 2a is changed into the second state shown in FIG. 2b as the angle between the first body 101 and the second body 102 is changed by the hinge part 200, the length of the display unit 151 at obtuse angle is increased and the length at an acute angle is decreased. The curvature of the flexible display unit 151 is variable, not the length. If the display unit 151 fits lengths on the basis of the second state of the long display unit, the flexible display unit 151 might be folded in the first state disadvantageously. In contrast, if the display unit 151 fits the lengths on the basis of the first state, the flexible display unit 151 might be damaged in the state changing into the second state.

To solve the disadvantages, at least one side of the flexible display unit 151 may further include a sliding member 103 configured to slide with respect to the first body 101 or the second body 102. Sliding members 103 may be provided in both sides of the flexible display unit 151, respectively. In the illustrated embodiment, one sliding member 103 is provided only in the first body 101 and the second body 102 is fixed to the flexible display unit 151.

Once one end of the flexible display unit 151 is coupled to the sliding member 103 configured to slide in one direction, the angle of the hinge part 200 is able to be changed even without changing the length of the flexible display unit 151. When the sliding member 103 is moved toward the hinge part 200 in one direction in the second state, the end of the first body 101 is exposed as shown in FIG. 2b.

The flexible display unit 151 includes a first area 1511 located in one surface of the first body 101 in the second state; a second area 1512 located in one surface of the second body 102; and a third area 1513 located between the first area 1511 and the second area 1512. The third area 1513 is provided to cover a lateral surface of the first body 101 and a lateral surface of the second body 102 in the second state.

When the first body 101 and the second body 102 are changed from the second state to the first state, the location of the second area 1512 in the flexible display unit 151 is not changed but the locations of the first area 1511 and the third area 1513 are changed. At this time, the first area 1511 and the third area 1513 are located on one surface of the first body 101 in the first state.

In other words, as the third area 1513 covering one surface of the first body 101 in the first state is moved toward the lateral surface of the mobile terminal, one end of the first body 101 becomes exposed as much as the width corresponding to the third area 1513.

The first audio output unit 152a is realized as a receiver configured to deliver a call sound to the user's ear and the second audio output unit 152b may be realized as a loud speaker configured to output diverse alarm sounds or playing sound of multimedia.

The optical output unit 154 is configured to output light for noticing an event. Examples of the event include message receiving, call signal receiving, an unanswered call, an alarm, schedule notification, e-mail receiving and application information receiving. Once sensing that the user checked the event, the controller 180 is implemented to control the output unit 154 to finish the light output.

The camera 121 is configured to process an image frame of a still image or moving images which is acquired by an image sensor in a camera mode or a video telephony. The processed image frame may be displayed on the display unit 151 and stored in the memory 170.

The camera 121 of the mobile terminal in accordance with the present disclosure is coupled to the first body 101 and covered with the flexible display unit 151 in the first state. The camera 121 is exposed in the second state as shown in FIG. 2b. In other words, the camera 121 may be arranged to be located in one surface (hereinafter, 'the open portion') of the first body which is exposed as the sliding member 102 is moved.

In the open portion which is exposed by the sliding motion of the sliding member 103 may be arranged not only the camera but also a flash 124 for assisting the function of the camera, the user input unit 123, a fingerprint recognizing sensor 143 and the proximity sensor 142.

The user input unit 123 serves as one example of the user input unit 123 which is manipulated so as to receive an input of a command for controlling the operation of the mobile terminal 100 and called 'the manipulating portion'. Any types of the user input unit 123 may be adopted only if using a tactile manner. The user input unit 123 may adopt other manners which may be implemented without the user's tactile manipulation by using a proximity touch and a hovering touch. The contents input through the user input unit 123 may be preset diversely.

Meanwhile, the mobile terminal 100 may further include a fingerprint recognizing sensor configured to recognize the user's fingerprint. The controller 180 may use the information about the fingerprint sensed by the fingerprint recognizing sensor 143 as means of authentication. The fingerprint recognizing sensor 143 may be embedded in the display unit 151 or the user input unit 123.

The microphone 122 is configured to receive the inputs of the user's voice and other sounds. A plurality of microphones 122 may be provided to receive stereo sound inputs.

The interface unit 160 serves as a passage for connecting the mobile terminal 100 with an external device. For example, the interface unit 160 may be at least one of a connection terminal for connecting the mobile terminal with other external devices (e.g., an earphone and an external speaker), a port for short range communication (e.g., a IrDA port), a Bluetooth port, a wireless LAN port and a power supply terminal for supplying the electric power to the mobile terminal 100. Such the interface unit 160 may be realized as SIM (Subscriber Identification Module), UIM (User Identity Module), a memory card for storing information or other socket types for loading an external card.

The second audio output module 152b may be additionally arranged in the terminal body and configured to realize a stereo function, together with the first audio output unit 152a. Also, the second audio output module 152b may be used in realizing a speaker phone mode when making or receiving a call.

At least one antenna for wireless communication may be provided in the terminal body. The antenna may be embedded in the terminal body or formed in the case. For example, the antenna partially forming the broadcast receiving module (111, see FIG. 1) may be retractable from the terminal body or provided as a film type which is attached to an inner surface of the rear cover 103. Also, the case including a conductive material may function as the case.

The power supply unit (190, see FIG. 1) for suppling the power to the mobile terminal 100 may be provided in the terminal body. The power supply unit 190 may include the battery 191 embedded in the terminal body or demountable from an outer portion of the terminal body.

The battery 191 may be supplied the electric power via a power cable connected to the interface unit 160. Alternatively, the battery 191 may be wirelessly charged from a wireless charging device. The wireless charging may be realized by an electromagnetic inductive method or a resonance method (magnetic resonance method).

Accessories may be additionally provided in the mobile terminal 100 to protect the exterior design or assist or expand the functions of the mobile terminal 100. One example of the accessories may be a cover or pouch which covers or accommodates one or more surfaces of the mobile terminal 100. The cover or pouch may be interlocked with the display unit 151 to expand the functions of the mobile terminal 100. Another example of the accessories may be a touch pen for assist or expand the touch input to the touch screen.

Figure 3:
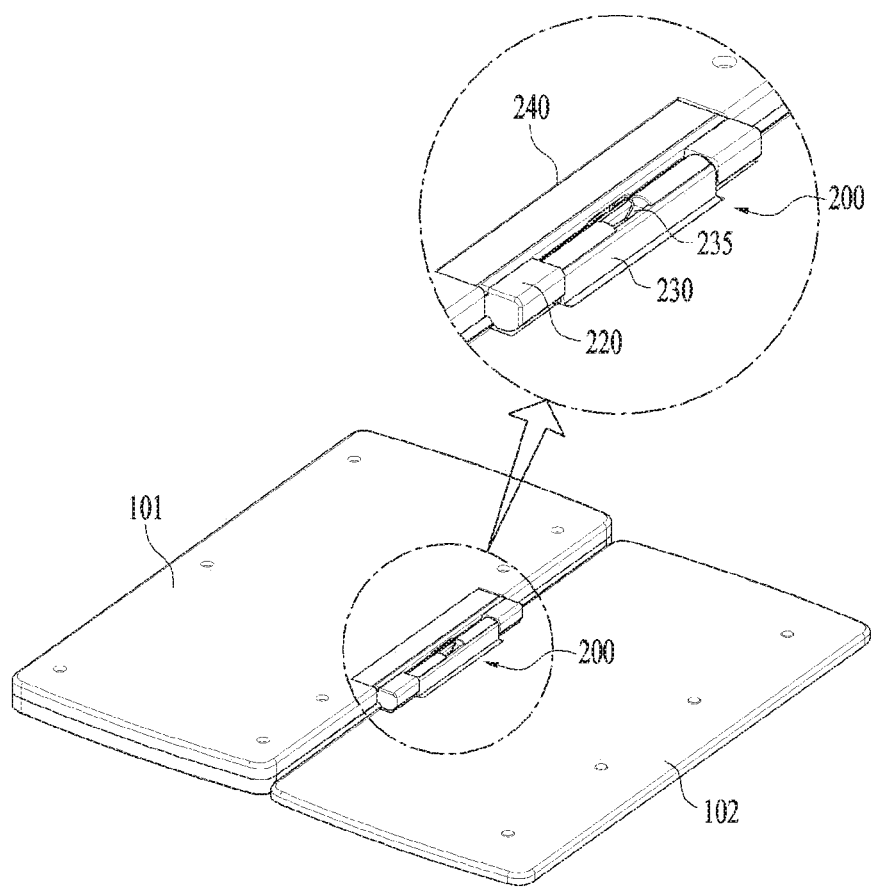
FIG. 3 is a rear view illustrating the first state of the mobile terminal in accordance with the embodiment.

FIG. 3 is a rear view illustrating the first state of the mobile terminal in accordance with the embodiment. In case the surface in which the display unit is disposed is defined as one surface, the rear surface is the other surface located in opposite. The rear surface is directed in opposite to the flexible display unit 151 in the first state and the other surface of the first body 101 faces the other surface of the second body 102, in a state of being overlapped with each other.

A conventional hinge includes a hinge shaft penetrating the first body 101 and the second body 102 or is located in an outer portion with respect to the rotational direction in which the first body 101 is overlapped with the second body 102. In the former case, the first body 101 and the second body 102 are not overlapped with each other disadvantageously. In the latter case, the first and second bodies 101 and 102 are overlapped with each other but the hinge is exposed outside. Also, the flexible display unit 151 may not be arranged in the outer portion as shown in FIGS. 2a and 2b.

When the hinge is arranged between the first body 101 and the second body 102 overlapped with each other, a groove has to be formed in each of the first and second bodies 101 and 102 to the depth corresponding to a half of the hinge thickness. However, the first body 101 of the present disclosure is relatively thick and the second body 102 is relatively thin so that it is difficult to form such grooves. Also, only the hinge part 200 is projected from the rear surfaces of the first and second bodies 101 and 102 so that the mobile terminal might be rested on the floor unstably.

The first body 101 and the second body 102 are able to be arranged side by side in the first state and closely overlapped with each other in the second state by using the hinge part 200 arranged between the first and second bodies 101 and 102 when the two bodies are overlapped with each other and configured to perform the rotational motion and the sliding motion at the same time.

Figure 4:
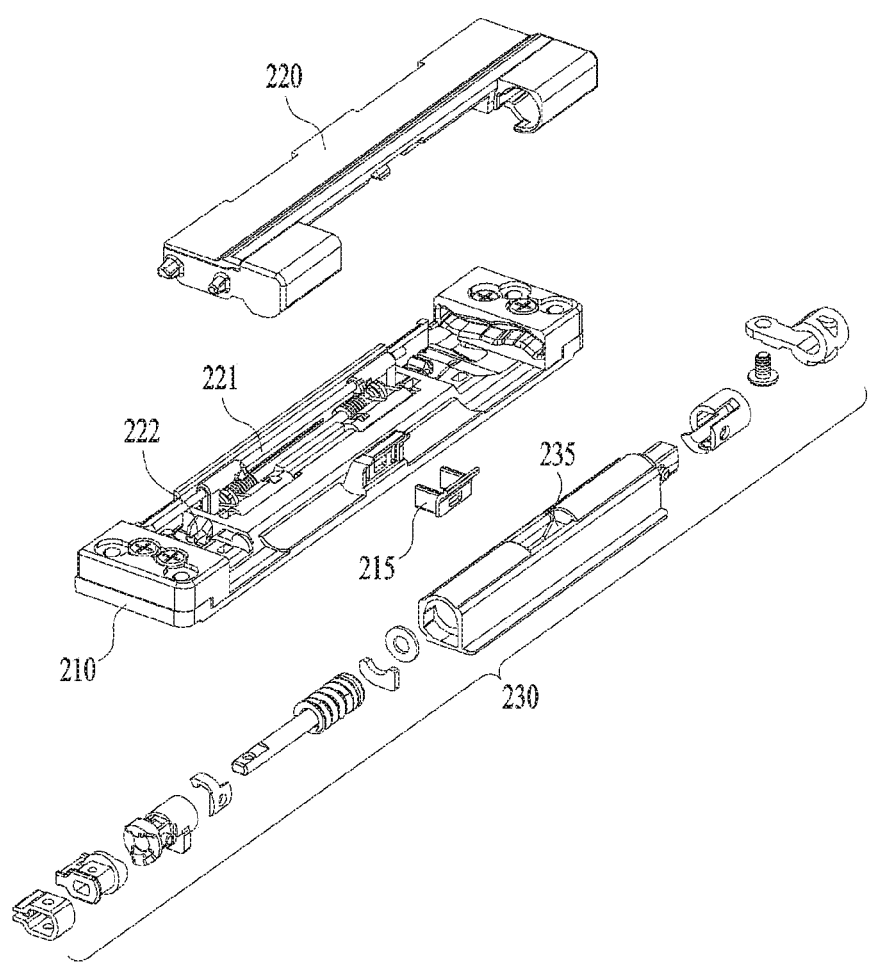
FIG. 4 is an exploded perspective diagram illustrating a hinge part of the mobile terminal.
Figure 5:
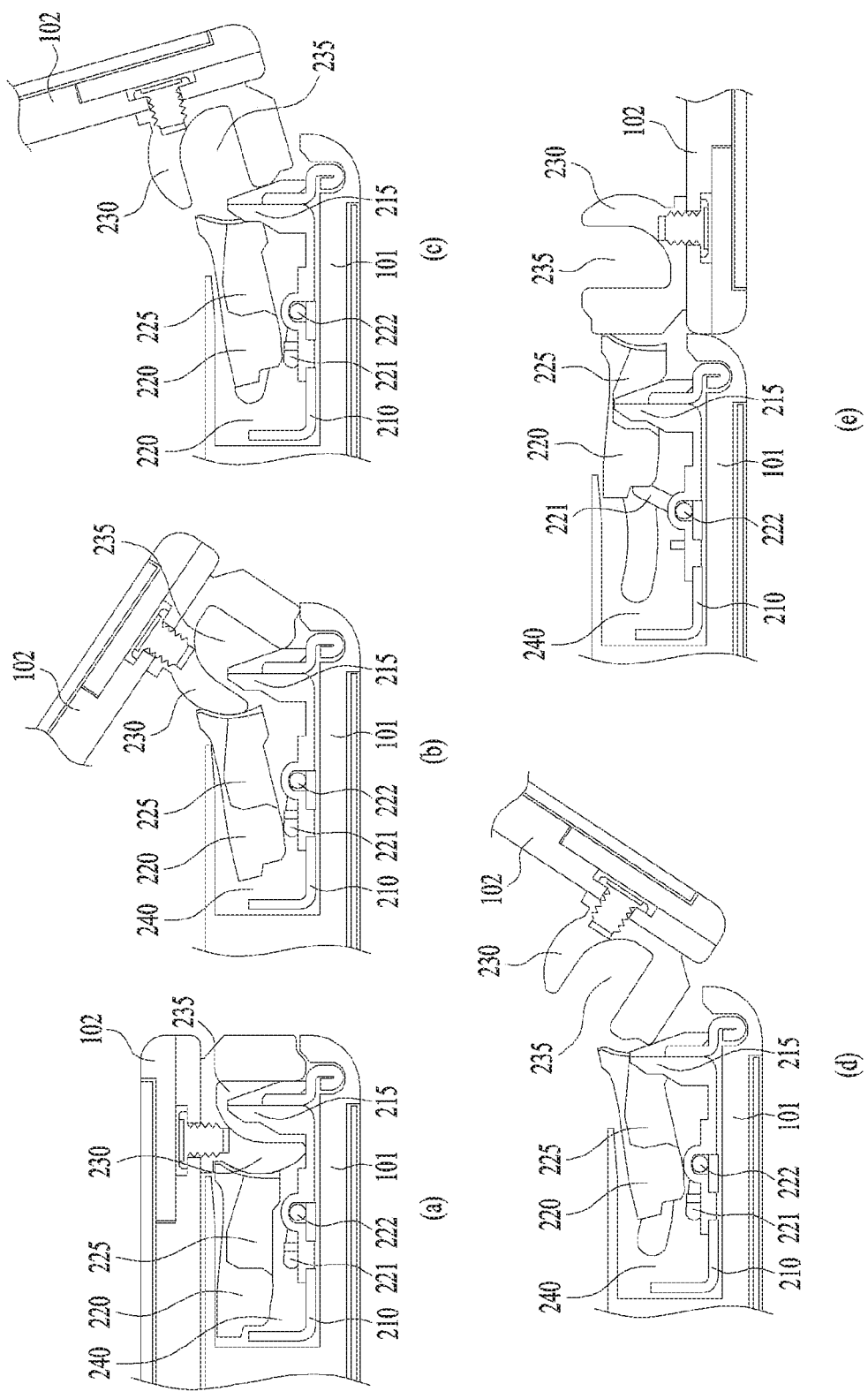
FIG. 5 is a diagram illustrating the drive of the hinge part provided in the mobile terminal.

FIG. 4 is an exploded perspective diagram illustrating the hinge part 200 of the mobile terminal. FIG. 5 is a diagram illustrating the drive of the hinge part 200 provided in the mobile terminal. The hinge part 200 includes a first bracket 210 fixed to the first body 101; a second bracket configured to slide toward the first bracket 210 in a first direction; and a third bracket 230 rotatably coupled to the second bracket and the second body 102.

The hinge part 200 is movable into and from a hinge groove 240 recessed from the rear surface of the first body 101. The hinge groove 240 is formed in the portion where the first bracket 210 is fixed and the first bracket 210 is coupled to a bottom of the hinge groove 240.

FIG. 5(a) illustrates the hinge part 200 in the second state and FIG. 5 € illustrates the hinge part 200 in the first state. FIGS. 5(b) through 5(d) illustrate the operations of the components provided in the hinge part 200 at the angle between the first state and the second state.

The hinge part 200 in accordance with the present disclosure is characterized in that the second bracket is configured to perform the sliding motion with respect to the first bracket 210 simultaneously when the third bracket 230 performs the rotational motion with respect to the second bracket. The rotational motion is performed to change the angle formed by the first body 101 and the second body 102. When the first body 101 is overlapped with the second body 102, the entire hinge part 200 is inserted in the hinge groove 240 formed in the first body 101 as shown in FIG. 5(a). When the first body 101 and the second body 102 are located side by side, the hinge part 200 is projected from the hinge groove 240 to be located in the rear surface of the second body 102.

The rotational motion is performed by the third bracket 230 which is rotated on the shaft penetrating the second and third brackets. The sliding motion is performed by the second bracket rotating along a rail formed in the third bracket 210. This illustrated embodiment may use a link 221 and 222.

The link 221 and 222 may have one end and the other end rotatably coupled to different members, respectively, so that it can be rotated on the end and the other end as its shafts to change a linear distance to the members located in the end and the other end. In this embodiment, two links 221 and 222 are disposed between the first bracket 210 and the second bracket. The links 221 and 222 are moving to guide the motion of the second bracket with respect to the first bracket 210 along the width direction of the first body 101.

The first bracket 210 includes a cam 215 projected toward the rear surface. The cam 215 is configured to guide the rotation of the third bracket 230 and fix the second bracket to stop the hinge part 200 from being rotated any further in the first state so as to restrict the range of the sliding motion performed by the second bracket. As shown in FIG. 5, a fixing groove 225 may be formed in an opposite direction facing the cam 215. The fixing groove 225 is open toward the third bracket 230 so as not to collide with the cam 215 at the angle between the state of FIG. 5(b) and the state of FIG. 5(d).

The third bracket 230 located in the outer portion of the hinge groove 240 in the first state not to be overlapped with the first bracket 210 is slidingly moved and inserted in the hinge groove 240 to be overlapped with the cam 215. The third bracket 230 may include a cam receiving groove 235 for receiving the cam 215.

Figure 6:
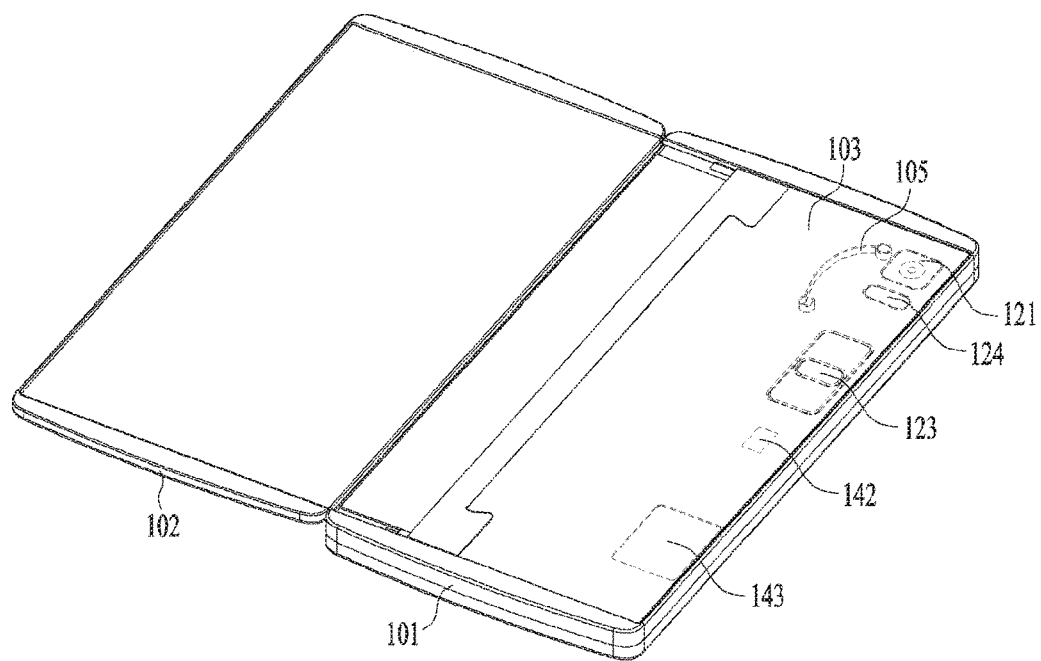
FIGS. 6 through 8 are diagrams to describe driving of a sliding member and a flexible member which are provided in the mobile terminal.
Figure 6:
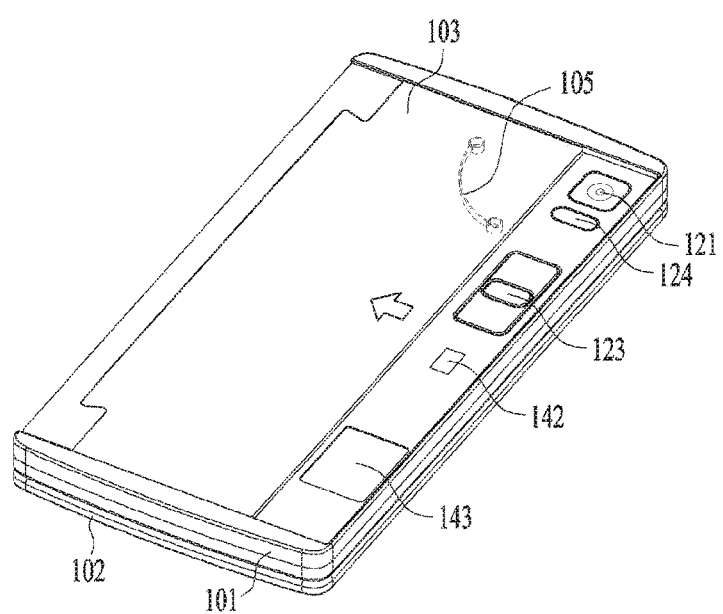
Figure 7:
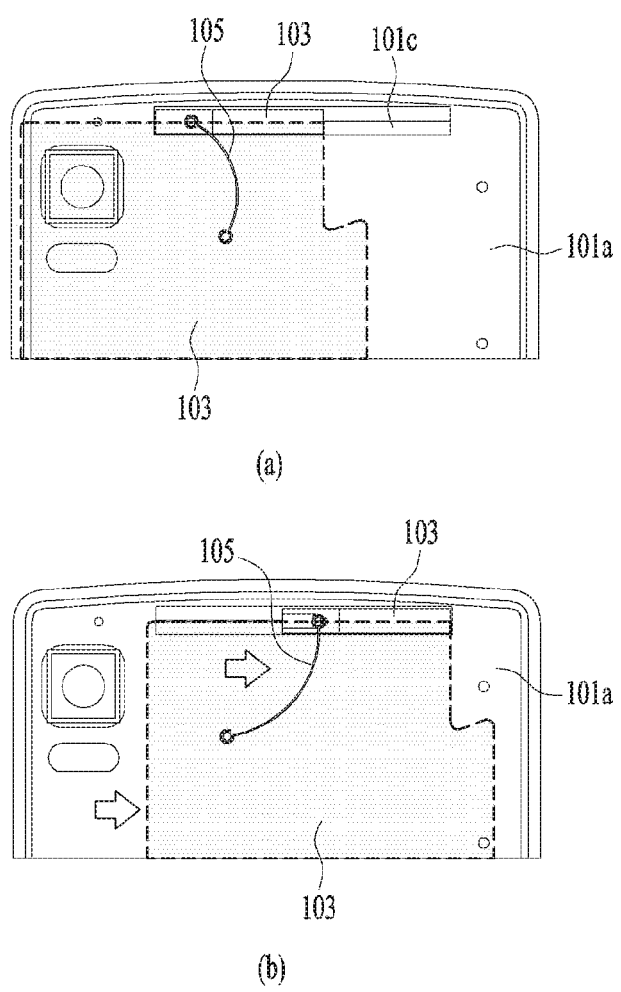
Figure 8:
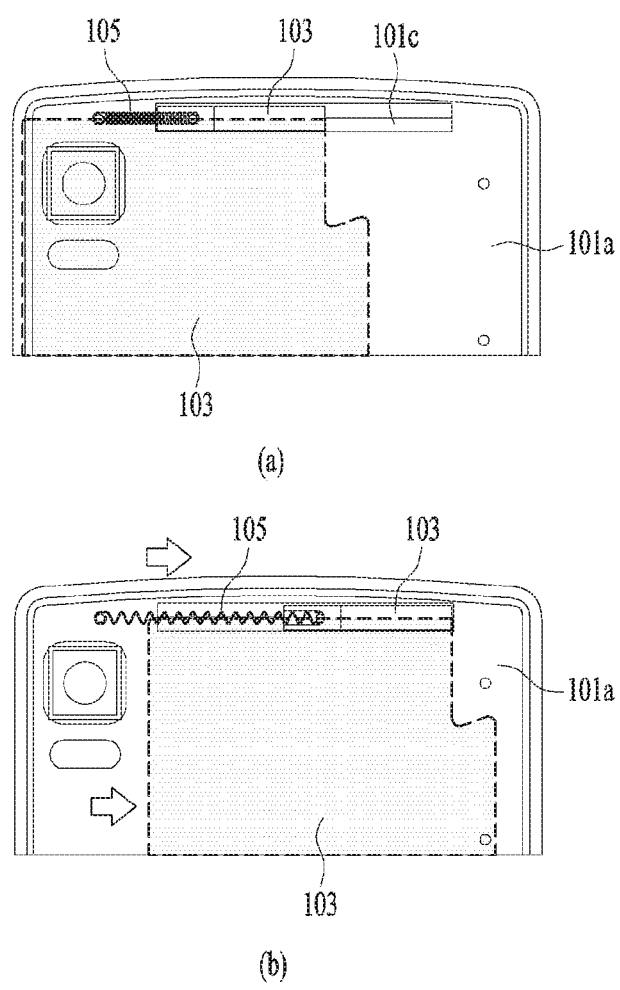

FIGS. 6 through 8 are diagrams to describe the driving of the sliding member 103 and the flexible member 105 which are provided in the mobile terminal. The flexible display unit 151 may be movable as shown in FIGS. 2a and 2b, because it has to cover the front surfaces of the first and second bodies 101 and 102 and also the lateral surfaces of the first and second bodies 101 and 102 according to the variation of the angles between the first body 101 and the second body 102.

FIG. 6 illustrates a state where the display unit 151 is removed from the embodiments of FIGS. 2a and 2b. A sliding member 103 is provided between the flexible display unit 151 and the first body 101. The sliding member 103 is able to linearly move in a preset range along the first direction (the lateral direction) with respect to the first body 101. One end of the flexible display unit 151 is coupled to the sliding member 103 and then the portion of the flexible display unit 151 located in one surface of the first body 101 is applied a pulling force toward the hinge part 200, when the first state is changed into the second state by the rotation of the hinge part 200. Such a tensile force facilitates the sliding motion of the sliding member 103 toward the hinge part 200 along the lateral direction as shown in FIG. 6(b).

A flexible member 105 may be used in fixing the first state and the second state when the sliding member 103 is slidingly moved and automatically changing the current state into the first state and the second state before the angle between the first body 101 and the second body 102 reaches 180° or 0° even without the user's changing the angle to reach the first or second state.

The flexible member 105 is deformable when being applied an external force and applies a force to returning to its original state when the applied external force is removed. The flexible member 105 shown in FIGS. 6(a) and 6(b) is a plate spring. When an external force is applied to the plate spring in a longitudinal direction, the plate spring is curved to change one end and the other end thereof but there is the elasticity to restoring the original length.

One end of the flexible member 105 is rotatably coupled to the first body 101 and the other end is rotatably coupled to the sliding member 103. The coupling position of the flexible member 105 is determined as the point where the distance to one end is equal to the distance to the other end of the flexible member 105 when the sliding member 103 is moved to the position shown in FIG. 6(b) from the position shown in FIG. 6(a).

Accordingly, the flexible member 105 may have the maximum length in the first state and the second state. One end of the other end of the elastic member 105 becomes short at a middle state between the first and second states. The middle state between the first state and the second state, in other words, the position where the first body 101 and the second body 102 form 90°. When the angle becomes larger than 90°, the restoring force configured to be deformed to the first state is activated. When the angle becomes smaller than 90°, the restoring force configured to be deformed into the second state is activated.

When the first state is changed into the second state, the sliding member 103 is sliding naturally even without the deforming force. When the second state is changed into the first state, the deforming force facilitates the motion of the sliding member 103 while the curved flexible display unit is keeping a slick surface, not curved and projected toward the front surface.

The flexible member 105 may be located in one surface of the first body as shown in FIG. 6. Alternatively, an opening may be formed in the case of the first body 101 and the flexible member 105 may be located in the first body 101 via the opening. FIG. 7 is a diagram illustrating another embodiment of the flexible member 105, viewing the front case of the first body 101 from the inside. The sliding member indicated by a dotted line may be located in an outer surface of the front case.

One end of the flexible member 105 is coupled to an inner surface of the front case and the sliding member 103 is connected with the other end of the flexible member 105 via the opening formed in the front case. The flexible display unit 151 is pulled by the angle variation of the hinge part 200. When an external force is applied to the sliding member 103, the deformation occurs as shown in FIGS. 7(a) and 7(b).

Alternatively, a coil spring may be used as the flexible member 105 shown in FIG. 8. In case of using the coil spring, a locking device for keeping the angle of the hinge part 200 has to be provided to maintain the second state. When the locking device is unlocked, the second state is automatically changed into the first state by the restoring force of the coil spring.

Figure 9:
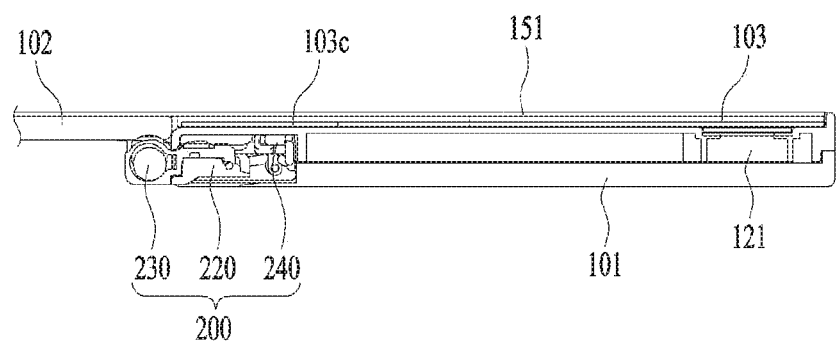
FIG. 9 is a sectional diagram illustrating the mobile terminal.
Figure 9:
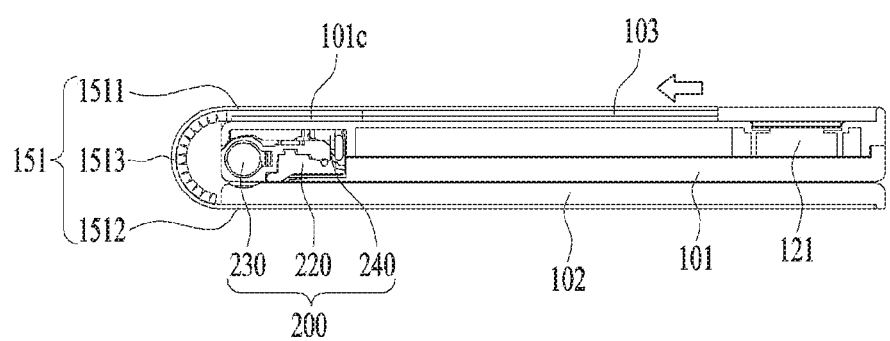

FIG. 9 is a sectional diagram illustrating the mobile terminal. FIG. 9(a) is a sectional diagram illustrating the first state and FIG. 9(b) is a sectional diagram illustrating the second state.

In the second state, the third area 1513 of the flexible display unit 151 is located in the lateral surface of the mobile terminal a bending portion is formed between the first area 1511 and the third area 1513 and between the second area 1512 and the third area 1513.

Some types of the flexible display unit 151 cannot be bent while forming the bent portion. The third area 1513 may form a curved surface in the second state as shown in FIGS. 10a and 10b so as to allow the first area 1511, the third area 1513 and the second area 1512 to form a continuous surface.

Figure 10A:
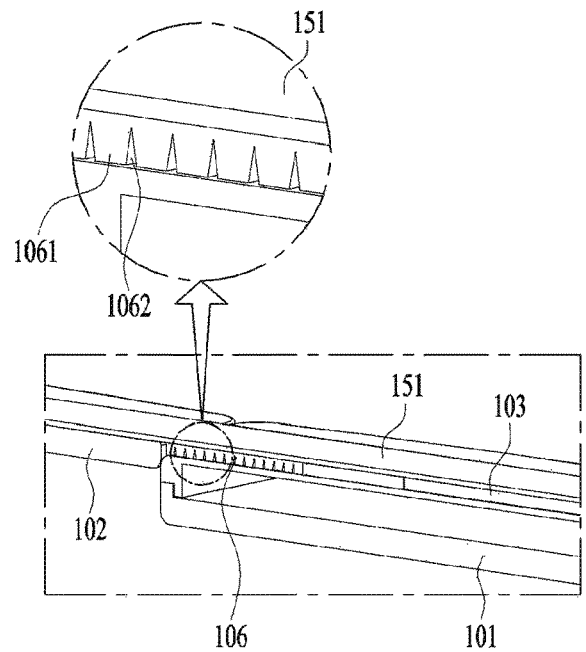
FIGS. 10a and 10b are sectional diagrams illustrating a mobile terminal in accordance with another embodiment.
Figure 10B:
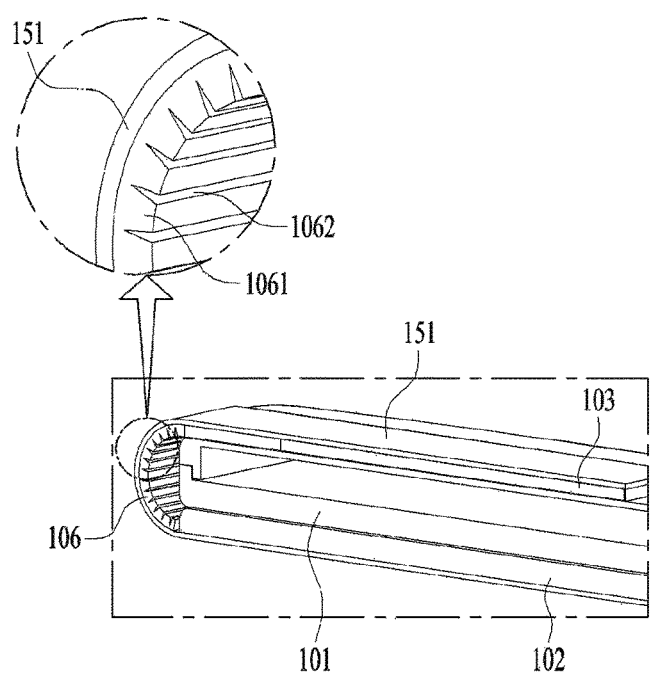

Compared with the embodiment of FIG. 9, the embodiment of FIGS. 10a and 10b shows a larger third area 1513 enough to increase motion distance of the flexible display unit 151. A display support portion 106 may be further provided in the rear surface of the third area 1513 to form a natural curved surface in the third area 1513 in the second state. The display support portion 106 is configured to support the rear surface of the flexible display unit 151 to keep a flat state of the third area 1513 in the first state. A V-shaped groove 1062 may be provided to keep the curved state of the third area 1513 in the second state.

The V-shaped groove 1062 becomes narrower from a wide entrance and extended in the longitudinal direction of the mobile terminal as shown in FIGS. 10a and 10b. A saw-tooth portion 1061 defined by the V-shaped groove 1062 may be formed in a trapezoid shape. As the curvature of the third area 1513 provided in the flexible display unit 151 is changed, the width of the V-shaped groove 1062 is changed and then the curvature of the display support portion 106 is changed.

As shown in FIG. 10a, the display support portion 106 is located in one surface of the first body in the first state. In this instance, when the thickness of the sliding member 103 is different from that of the flexible display support portion 106, the surface of the flexible display unit 151 may not be smooth by the structure of the rear surface of the flexible display unit 151 disadvantageously. Accordingly, it is preferred that the thickness of the display support portion 106 is equal to that of the sliding member 103.

Figure 11:
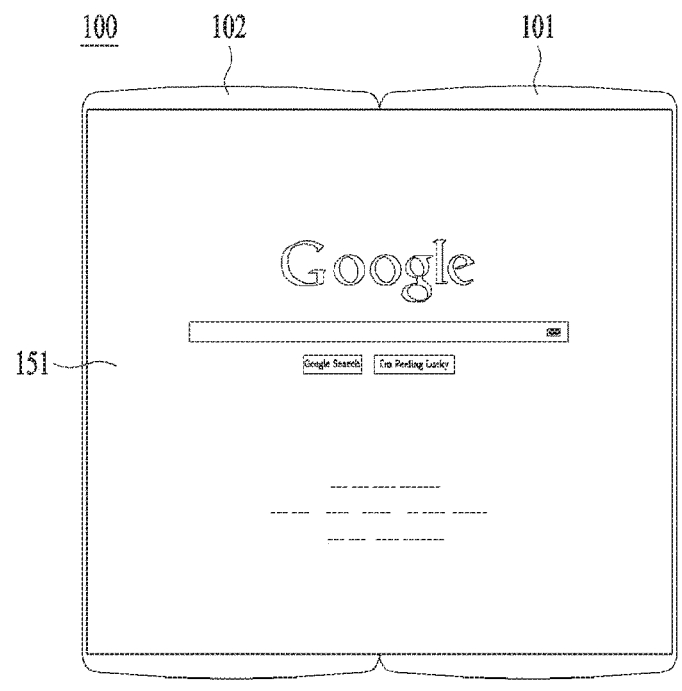
FIG. 11 is a diagram to describe changes in the screen output on a display unit as a state of the mobile terminal is changed.
Figure 11:
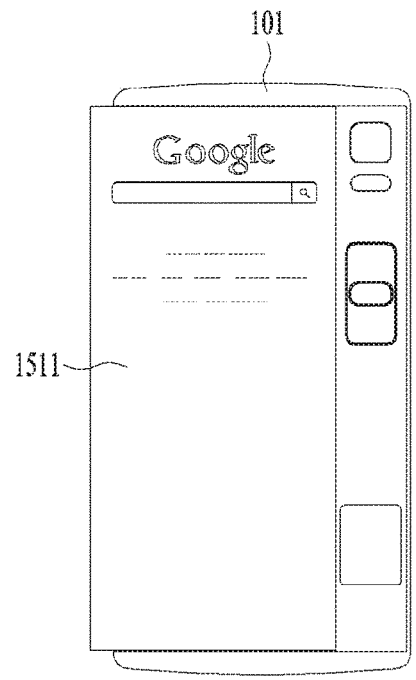
Figure 11:
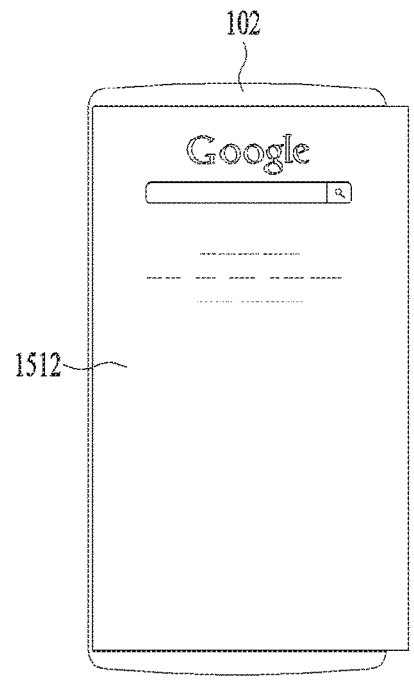

FIG. 11 is a diagram to describe changes in the screen output on the flexible display unit 151 as a state of the mobile terminal is changed. As shown in FIG. 11(a), the entire flexible display unit 151 may be used as one screen in the first state or divided into a plurality of screens as the user's demands.

As shown in FIGS. 11(b) and 11(c), the user is unable to view the flexible display unit (the first area) 1511 located in the first body 101, the flexible display unit (the second area) 1512 located in the second body 102 and the flexible display unit (the third area 1513 located in the lateral surface of the second body 102 simultaneously, so that the screen is divided into the first area 1511, the second area 1512 and the third area 1513 to provide different images or the same image. In case of providing the same image, the screens of the other areas may be the same by controlling the screen of the first or second area 1511 or 1512.

The image may be provided to the first area 1511 or the second area 1512 selectively. The image is provided to the corresponding area by sensing the screen viewed by the user. When it is determined that the user is viewing the screen from the image acquired by using the camera provided in the first body 101, the image is provided to the first area 1511 where the camera is located and the image is provided to the second area 1512 in the reverse case.

Figure 12:
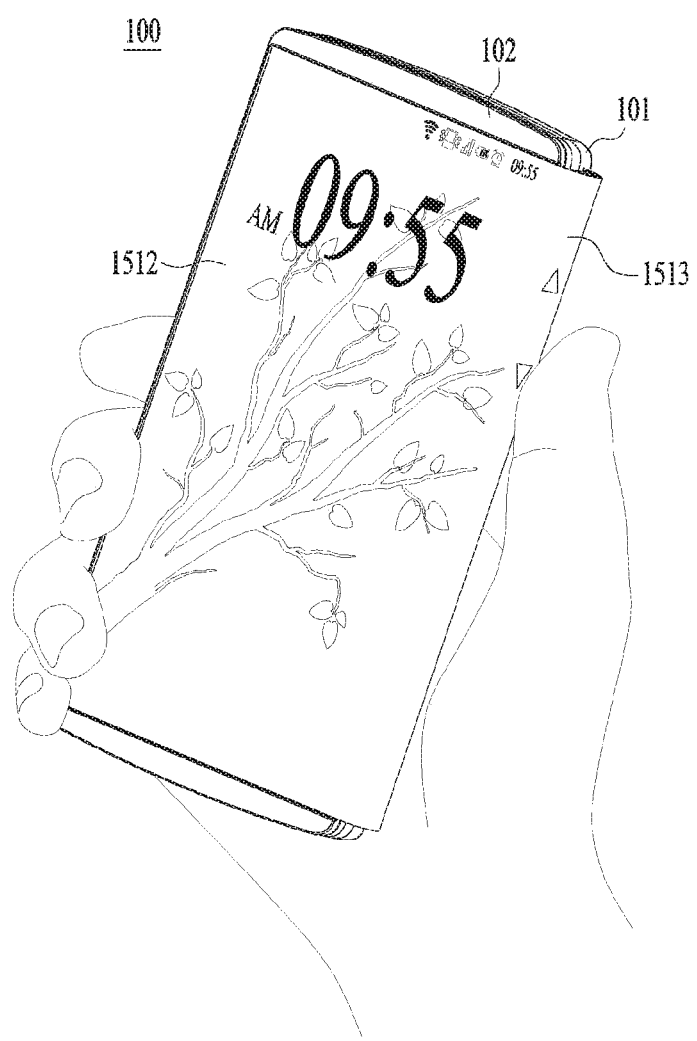
FIG. 12 is a diagram illustrating a use embodiment in the second state of the mobile terminal.

Alternatively, the slope of the mobile terminal may be sensed by using the gyro-sensor. it is determined that the user uses the screen located upward out of the first and second areas by sensing the slope state shown in FIG. 12 and the image is provided to the area located in the upper portion.

When the user is holding the mobile terminal, the user's palm may contact with the screen not viewed by the user. For example, when the user is viewing the second area 1512, a touch input is sensed in a wider range of areas than a reference range for a longer time period than a reference time period. In other words, the first area 1511 may be deactivated as the screen not viewed by the user. At this time, the meaning of the deactivation means not only providing no image but also touch sensor deactivation.

Figure 13:
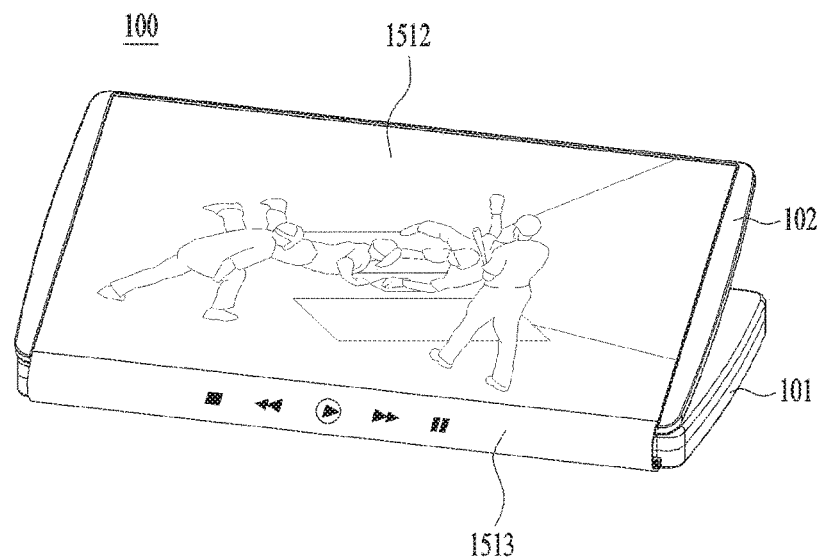
FIGS. 13 and 14 are diagrams illustrating another use embodiment of the mobile terminal.

When one surface is rested on the floor as shown in FIG. 13, it is determined that the rested area is not viewed by the user and the corresponding area may be deactivated. The rested surface or area may be sensed by using the proximity sensor or the illuminance sensor.

The image may be provided based on the result of the determination of the screen viewed by the user by applying each of the methods mentioned above or all of the methods.

FIG. 12 is a diagram illustrating a use embodiment in the second state of the mobile terminal. The third area 1513 is located in the lateral surface of the mobile terminal so that the function of the user input unit realized in the lateral surface of the conventional bar type mobile terminal may be realized in the third area 1513.

It is difficult for the user to recognize the exact location of the touch key, different from a physical key such as dome key and the touch input is consistently sensed in a state where the user is holding the mobile terminal, so that dragging may replace the key inputting. When the user is moving the finger in the longitudinal direction, the volume may be adjusted or the screen of the flexible display unit 151 may be scrolled vertically. When the user drags the finger in the thickness direction, the music may be played or paused or the screen is turned over to the next or former page.

As shown in FIG. 13, a control button may be provided in the third area 1513 to use the screen viewed by the user as wide as possible. For example, when the user is viewing the motion picture, a control button related with multimedia playing may be provided in the third area 1513.

The third area 1513 may function as a state display bar, rather than the control button. An icon, a number, letters and the like may be displayed so display main states of the mobile terminal which such as a new message, an update state, a battery condition and the current time may be displayed on the third area 1513. Alternatively, when a message is sent or a new alarm notice is generated in a standby state of the mobile terminal, only the third area 1513 is activated to notify the user of the alarms.

Figure 14:
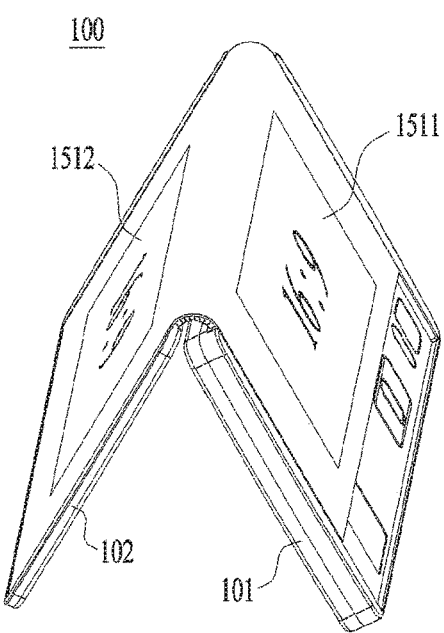

When the mobile terminal is rested as shown in FIG. 14, the first area 1511 and the second area 1512 may be used. The first and second areas 1511 and 1512 may be used as the screens viewable by two or more people or scores may be displayed to be viewed in plural directions as shown in FIG. 14. Also, the same screen may be provided to the both screens of the first and second areas 1511 and 1512, when two people facing each other are having conversation while watching the same screen. The same screen may be displayed on the first and second areas 1511 and 1512 and the screen may be arranged for the hinge part 200 to be directed upwards.

Figure 15:
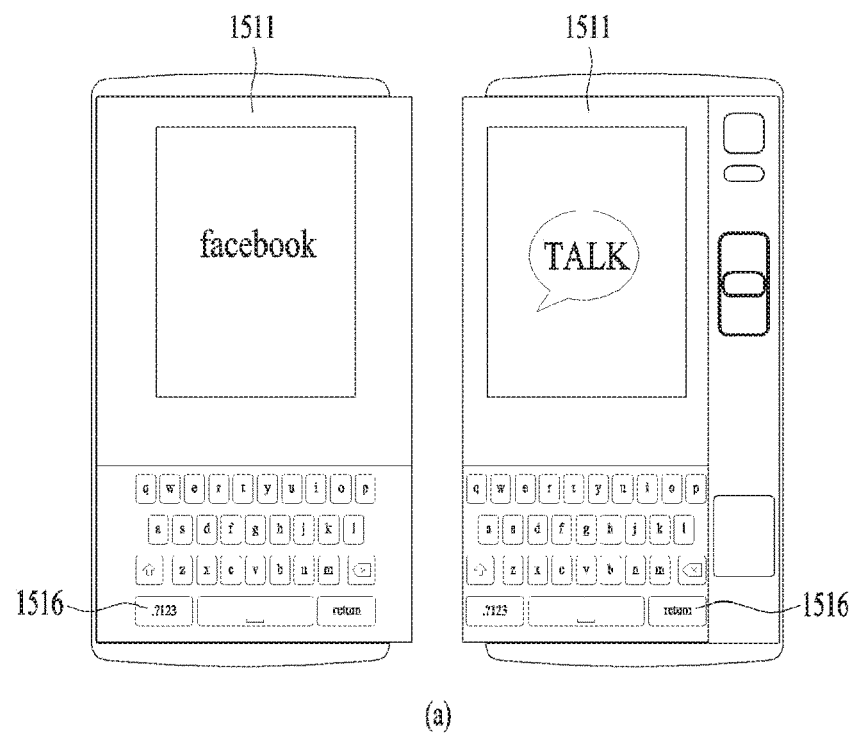
FIG. 15 is a diagram to describe arrangement of a texture input board provided in the mobile terminal.
Figure 15:
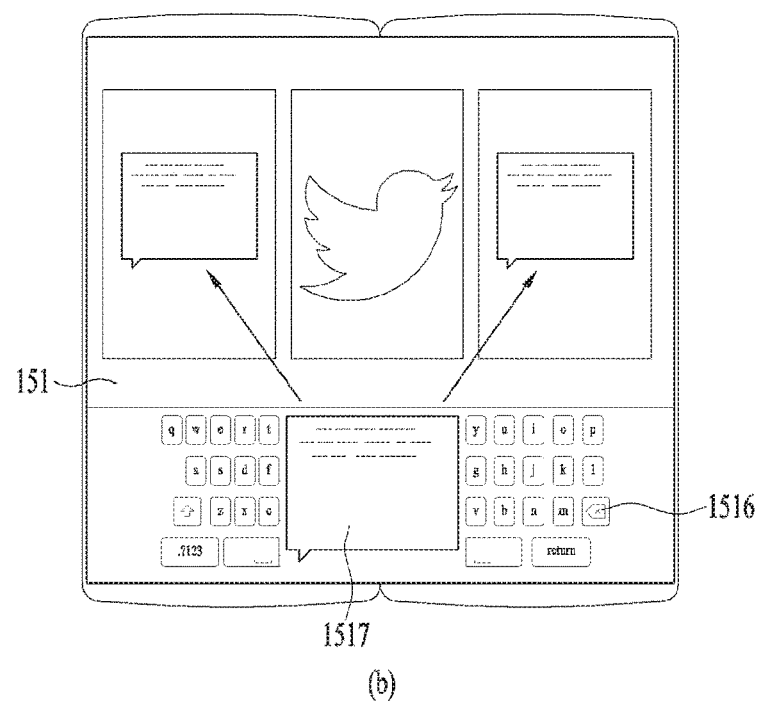

FIG. 15 is a diagram to describe arrangement of a texture input board provided in the mobile terminal. In the second state, independent applications may be provided to the screen as shown in FIG. 15(*a*). In the second state, the user is able to use a keyboard with both hands or one hand while holding both sides like the conventional bar type mobile terminal.

However, when the second state is changed into the unfolded first state, the overall area of the flexible display unit 151 becomes wide. If the keyboard is arranged in an entire lower area of the flexible display unit 151, it is difficult to input letters to the keyboard. Accordingly, as shown in FIG. 15(*b*), the keyboard is arranged after divided into left and right parts to enable the both hands to input letters. A letter input area or a clipboard area may be arranged between the divided keyboard parts.

In this instance, same letters may be input to a plurality of applications may be at the same time. For example, in a state where a first SNS, a second SNS and a third SNS are activated as shown in FIG. 15, some of the SNSs may be selected and the message input to the keyboard may be transmitted to the selected SNS.

Figure 16:
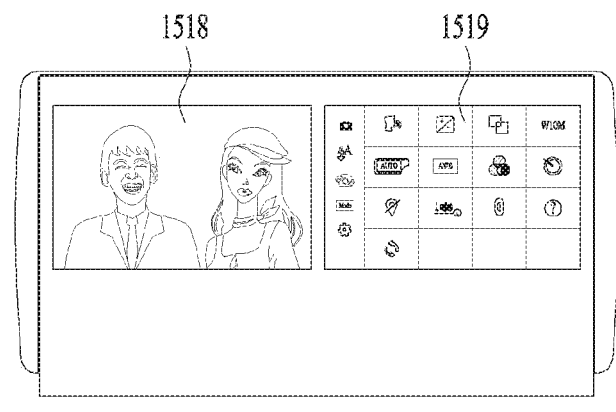
FIG. 16 is a diagram to describe the functions related with a camera application of the mobile terminal.
Figure 16:
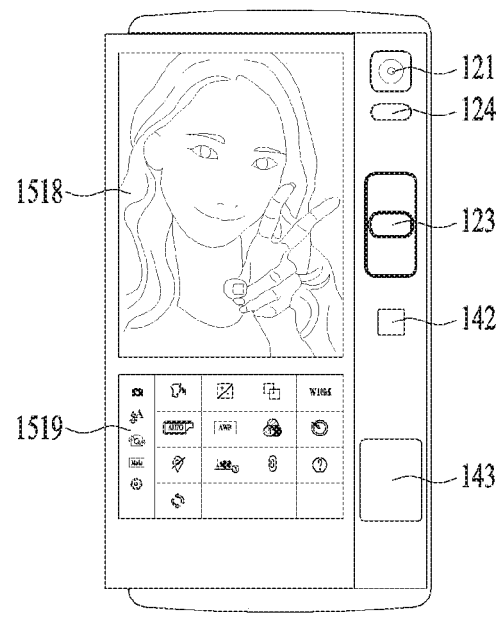

FIG. 16 is a diagram to describe the functions related with a camera application of the mobile terminal. When the current state is changed into the second state, the opening of the first body 101 is exposed and the camera is automatically activated.

At this time, the first area located in the first body where the camera is located and the second area 1512 located in the second body in opposite to the first body may be used or selectively used. For example, in a mode selfie-mode for taking a photo of the user himself or herself, the image is provided only to the first area 1511.

When the user sets the current mode as the selfie-mode, not image is provided to the second area 1512. In case the human face is sensed in a preset range of distances even if the user inputs auxiliary settings, it is determined that the current mode is the selfie-mode and a preview and setting menus may be provided to the first area 1511.

In case of taking a photograph of scenery or people, the user is viewing the second area 1512 and may use only the second area 1512 in a normal camera mode, while the first area is deactivated. Even in this instance, when the size of the face is a preset size or less in case there are people located in a photographed image, the current mode is determined as the normal camera mode and the preview and setting menus may be provided only to the second area.

As mentioned above, the mobile terminal including the plurality of the bodies; and the flexible display unit 151 which is foldable with respect to the hinge part 200 for connecting the bodies with each other may have the advantage that the flexible display unit 151 located in the hinge part 200 has no folding on the surface, because the flexible display unit 151 is slidingly coupled to at least one body and slidingly moved along the rotation of the hinge part 200.

Furthermore, other screens may be provided to the screen of the flexible display unit 151 according to the locations of the bodies. Accordingly, the mobile terminal availability may be improved.

Still further, the body slidingly coupled to the flexible display unit 151 may include the camera selectively exposed along the motion of the flexible display unit 151 and secure a sufficient component loading space, together with the large screen.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a first body comprising an open region;
   a second body;
   a hinge configured to rotatably couple the first body with the second body, the hinge configured to allow movement of the mobile terminal between a first state and a second state;
   a flexible display comprising a first region positioned to cover at least a part of the first body and a second region positioned to cover at least a part of the second body;
   a touch sensor configured to sense a touch input to the flexible display;
   a sliding member coupled to a rear of the first region of the flexible display and configured to slide with respect to the first body,
   a camera disposed at the open region of the first body; and
   a controller,
   wherein the flexible display is configured to be bent according to movement between the first body and second body via the hinge,
   wherein the first body and the second body are side by side in the first state and the first body and the second body overlap each other in the second state,
   wherein the open region of the first body is covered by the flexible display when the mobile terminal is in the first state and exposed when the mobile terminal is in the second state, and
   wherein the controller is configured to activate the first region of the flexible display when it is determined that a user is viewing the first region based on an image acquired by the camera while the mobile terminal is in the second state.

2. The mobile terminal of claim 1, further comprising:
   a flexible member comprising one end coupled to the first body and the other end coupled to the sliding member to assist sliding of the sliding member.

3. The mobile terminal of claim 2, wherein the flexible member is a plate spring configured to apply a force to the sliding member.

4. The mobile terminal of claim 1, wherein:
the flexible display further comprises a third region between the first region and the second region;
when the mobile terminal is in the second position, the third region of the flexible display covers a side surface of the first body and the second body; and
when the mobile terminal is in the first position, the first region and the third region of the flexible display cover the first body.

5. The mobile terminal of claim 4,
wherein the controller is further configured to control the flexible display to display a touch key at the third region when the mobile terminal is in the second state.

6. The mobile terminal of claim 4, further comprising a display support portion located at a rear of the third region of the flexible display,
wherein the display support portion comprises a plurality of grooves to allow flexing of the display support portion when the mobile terminal is in the second state.

7. The mobile terminal of claim 6, wherein:
the sliding member is positioned to correspond to the first region of the flexible display; and
a thickness of the sliding member is the same as a thickness of the first region of the flexible display.

8. The mobile terminal of claim 4, wherein the controller is further configured to:
cause the flexible display to display a continuous image across the first region, the second region, and the third region when the mobile terminal is in the first state; and
cause the flexible display to display separate images on at least the first region, the second region, or the third region when the mobile terminal is in the second state.

9. The mobile terminal of claim 4,
wherein the controller is further configured to deactivate the touch sensor or disregard touch inputs received via the touch sensor for at least one of the first region, the second region, or the third region of the flexible display when a touch input is sensed at a corresponding region for greater than or equal to a reference time period when the mobile terminal is in the second state.

10. The mobile terminal of claim 1, wherein:
the open region further comprises at least a user input unit, a proximity sensor, or a fingerprint sensor.

11. The mobile terminal of claim 10, wherein the controller is further configured to activate at least the user input unit or the fingerprint sensor when the mobile terminal is moved to the second state.

12. The mobile terminal of claim 10, wherein the controller is further configured to:
cause the first region of the flexible display to display the image acquired by the camera when a human face greater than or equal to a reference size is recognized in the image; and
cause the second region of the flexible display to display the image acquired by the camera when no face greater than or equal to the reference size is recognized in the image.

13. The mobile terminal of claim 1, wherein the hinge is configured to provide rotational motion and sliding motion between the first body and second body, and the hinge comprises:
a first bracket coupled to the first body;
a second bracket configured to slide in a first direction with respect to the first bracket; and
a third bracket rotatably coupled to the second bracket and coupled to the second body.

14. The mobile terminal of claim 13, wherein:
the third bracket has an elongated shape and comprises a shaft; and
the second bracket is coupled to the shaft and covers both ends of the third bracket.

15. The mobile terminal of claim 14, wherein:
the first bracket comprises a cam projecting therefrom; and
the third bracket comprises a cam receiving groove configured to accommodate the cam therein when the mobile terminal is in the second state and configured to separate from the cam when the mobile terminal is in the first state.

16. The mobile terminal of claim 13, further comprising a hinge groove at a rear surface of the first body,
wherein the first bracket is coupled to an inner surface of the hinge groove, and
wherein the second bracket and the third bracket are accommodated in the hinge groove when the mobile terminal is in the second state and are moved outwardly from the hinge groove when the mobile terminal is in the first state.

17. The mobile terminal of claim 1, further comprising:
a gyro-sensor configured to sense a state orientation of the first body or second body; and
wherein the controller is further configured to:
cause the flexible display to display an image at a first region of the flexible display corresponding to the first body when the first body is positioned above the second body based on the sensed state orientation; and
cause the flexible display to display the image at a second region of the flexible display corresponding to the second body when the second body is positioned above the first body based on the sensed state orientation.

18. The mobile terminal of claim 1, wherein an area of the first body is equal to an area of the second body.

19. The mobile terminal of claim 1, wherein the flexible display is exposed outside of the mobile terminal in the second state.

20. A mobile terminal comprising:
a first body;
a second body;
a hinge configured to rotatably couple the first body with the second body and allow movement of the mobile terminal between a first state and a second state;
a flexible display comprising a first region positioned to cover at least a part of the first body and a second region positioned to cover at least a part of the second body;
a touch sensor configured to sense a touch input applied on the flexible display; and
a controller,
wherein the flexible display is configured to be bent according to movement between the first body and second body via the hinge,
wherein the first body and the second body are side by side in the first state and the first body and the second body overlap each other in the second state, and
wherein the controller is configured to deactivate the touch sensor or disregard touch inputs sensed via the touch sensor for the first region or the second region when a touch input is sensed at a corresponding region of the flexible display for greater than or equal to a reference time period in the second state.

* * * * *